US010086283B2

United States Patent
Trewartha et al.

(10) Patent No.: US 10,086,283 B2
(45) Date of Patent: Oct. 2, 2018

(54) MOTION SCORING METHOD AND APPARATUS

(71) Applicant: Sony Interactive Entertainment Europe Limited, London (GB)

(72) Inventors: Christopher Trewartha, London (GB); Jamie William Derbyshire, London (GB); David John Skilton, London (GB)

(73) Assignee: Sony Interactive Entertainment Europe Limited (GB)

( * ) Notice: Subject to any disclaimer, the term of this patent is extended or adjusted under 35 U.S.C. 154(b) by 698 days.

(21) Appl. No.: 13/650,338

(22) Filed: Oct. 12, 2012

(65) Prior Publication Data

US 2013/0095926 A1     Apr. 18, 2013

(30) Foreign Application Priority Data

Oct. 14, 2011 (GB) .................................. 1117790.4

(51) Int. Cl.
*A63F 13/213* (2014.01)
*A63F 13/46* (2014.01)
(Continued)

(52) U.S. Cl.
CPC .............. *A63F 13/46* (2014.09); *A63F 13/06* (2013.01); *A63F 13/213* (2014.09);
(Continued)

(58) Field of Classification Search
CPC ....... A63F 13/213; A63F 13/814; A63F 13/46
See application file for complete search history.

(56) References Cited

U.S. PATENT DOCUMENTS

| 5,694,340 A | 12/1997 | Kim |
| 2001/0016510 A1* | 8/2001 | Ishikawa et al. ................. 463/7 |

(Continued)

FOREIGN PATENT DOCUMENTS

| EP | 2142264 A1 | 1/2010 |
| EP | 1787690 B1 | 1/2011 |

(Continued)

OTHER PUBLICATIONS

Combined Search and Examination Report for Application No. GB1117790.4 dated Feb. 9, 2012.
Extended European Search Report for Application No. EP12185171 dated Mar. 18, 2013.
British Examination Report for Application No. GB1117790.4 dated May 20, 2013.

*Primary Examiner* — Jay Liddle
(74) *Attorney, Agent, or Firm* — Lerner, David, Littenberg, Krumholz & Mentlik, LLP (57) ABSTRACT

An entertainment system comprises at least one input for receiving data representative of a reference dance performance, a dance analyzer for generating data descriptive of an aspect of the reference dance, a key-point selector for selecting a plurality of key-points in the reference dance responsive to a property of the reference motion data, and an error tolerance calculator for generating error tolerance values at the plurality of key-points in the dance for use in scoring subsequent performances of the dance. The error tolerance values are responsive to a property of the reference motion data. An input may receive telemetry from one or more game controllers in communication with the entertainment system, in which the reference motion data comprises motion data generated by the dance analyzer from the telemetry received from one or more game controllers while the controller(s) was held during the reference performance of the dance.

19 Claims, 3 Drawing Sheets

(51) Int. Cl.
*A63F 13/20* (2014.01)
*A63F 13/814* (2014.01)

(52) U.S. Cl.
CPC ..... *A63F 13/814* (2014.09); *A63F 2300/1012* (2013.01); *A63F 2300/1031* (2013.01); *A63F 2300/1093* (2013.01); *A63F 2300/61* (2013.01)

(56) References Cited

U.S. PATENT DOCUMENTS

| | | |
|---|---|---|
| 2002/0019258 A1 | 2/2002 | Kim et al. |
| 2004/0087366 A1 | 5/2004 | Shum et al. |
| 2010/0144436 A1* | 6/2010 | Marks et al. ................... 463/36 |
| 2010/0151942 A1* | 6/2010 | Horovitz ........................ 463/30 |
| 2011/0237330 A1* | 9/2011 | Asami ............................ 463/31 |
| 2011/0306396 A1* | 12/2011 | Flury et al. ..................... 463/7 |
| 2011/0306398 A1* | 12/2011 | Boch et al. ..................... 463/7 |
| 2012/0056800 A1* | 3/2012 | Williams et al. ............. 345/156 |
| 2012/0214594 A1* | 8/2012 | Kirovski et al. ................ 463/36 |
| 2012/0309536 A1* | 12/2012 | Langridge et al. ............. 463/39 |
| 2012/0319989 A1* | 12/2012 | Argiro ........................ 345/174 |

FOREIGN PATENT DOCUMENTS

| | | |
|---|---|---|
| WO | 0230535 A1 | 4/2002 |
| WO | 2005072831 A1 | 8/2005 |
| WO | 2011155958 A1 | 12/2011 |

* cited by examiner

MOTION SCORING METHOD AND APPARATUS

CROSS REFERENCE TO RELATED APPLICATIONS

The present application claims the benefit of and priority to GB Application No. 1117790.4, filed Oct. 14, 2011, the entire disclosure of which is incorporated by reference herein.

BACKGROUND OF THE INVENTION

Field of the Invention

The present invention relates to a motion scoring method and apparatus.

Description of the Prior Art

One of the many genres of video games is the dancing game, where players are challenged to mimic a reference dance that is portrayed on screen. The portrayal is typically either by a videogame character, a recorded live-video performance, or icons indicating the dance actions to perform. The player's dance inputs are then captured by a videogame console using one or more means. These include a dance mat (an array of pressure sensors or switches that send signals to the videogame console responsive to the player's foot positions), and more recently a video camera such as the Sony® EyeToy®, to directly capture a video feed of the player. Another capture mechanism is the Sony Playstation Move®, which can be tracked visually in conjunction with the EyeToy, and which also transmits motion telemetry directly to a videogame console such as the Playstation 3® based upon data generated by internal accelerometers and/or gyroscopes.

Conventionally, the reference dance performances included in the game are codified or 'marked up' by the videogame developer. Thus for example, a codified dance may be expressed as a list of time codes and motion data, the motion data describing either an expected position of one or more limbs or an expected movement of one or more limbs at the indicated time. Such positioning or movement is typically relative to a start point, so that it can be applied to the initial position of the player. The input from the player is then compared to the marked-up performance to generate a score for their rendition of the dance.

However, marking up a dance performance in this manner is laborious and difficult.

The present invention seeks to mitigate or alleviate this problem.

SUMMARY OF THE INVENTION

In a first aspect, an entertainment system is provided in accordance with claim 1.

In another aspect, a method of motion scoring is provided in accordance with claim 14.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A motion scoring method and apparatus are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1:
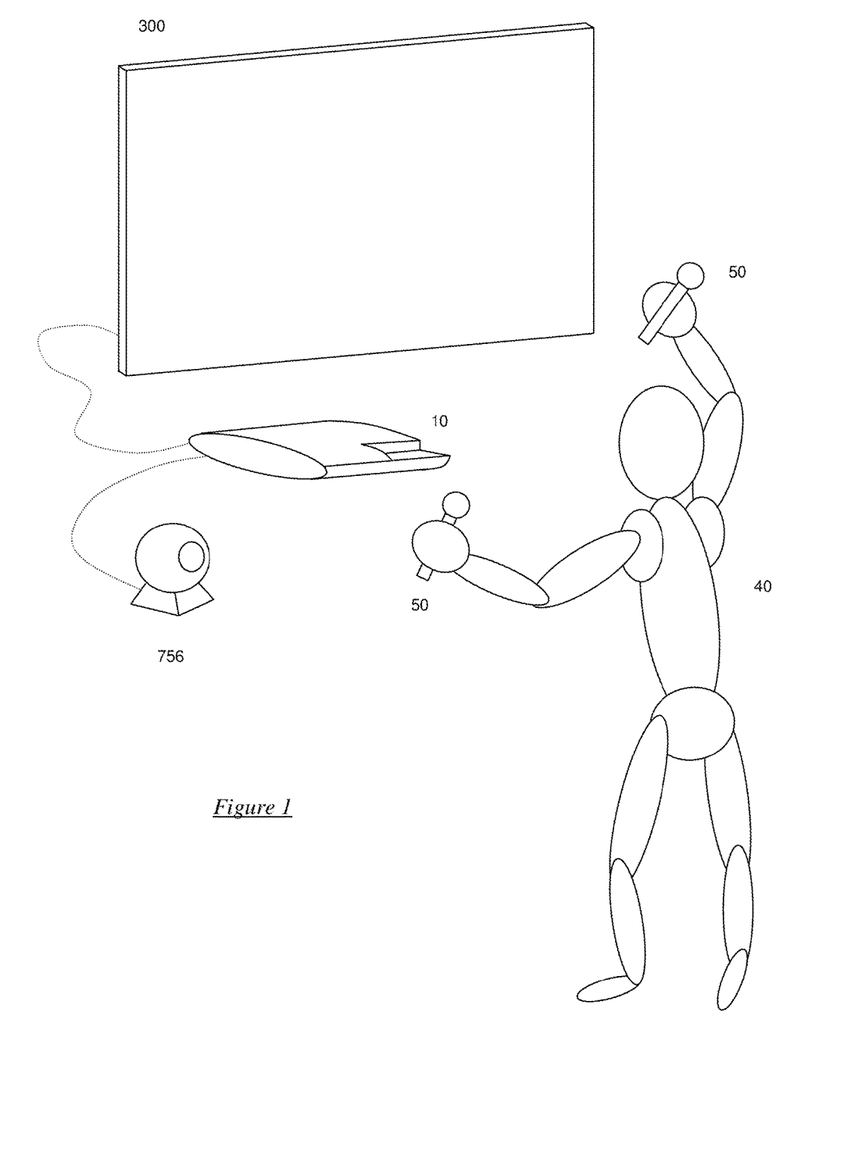
FIG. 1 is a schematic diagram of an entertainment system in accordance with an embodiment of the present invention, in use by a dancer.

Referring to FIG. 1, in an embodiment of the present invention an entertainment device 10 is operably coupled to a display 300 and an EyeToy 756 or other video camera. Meanwhile, a dancer 40 holds one or more PlayStation Move controllers 50.

Figure 2:
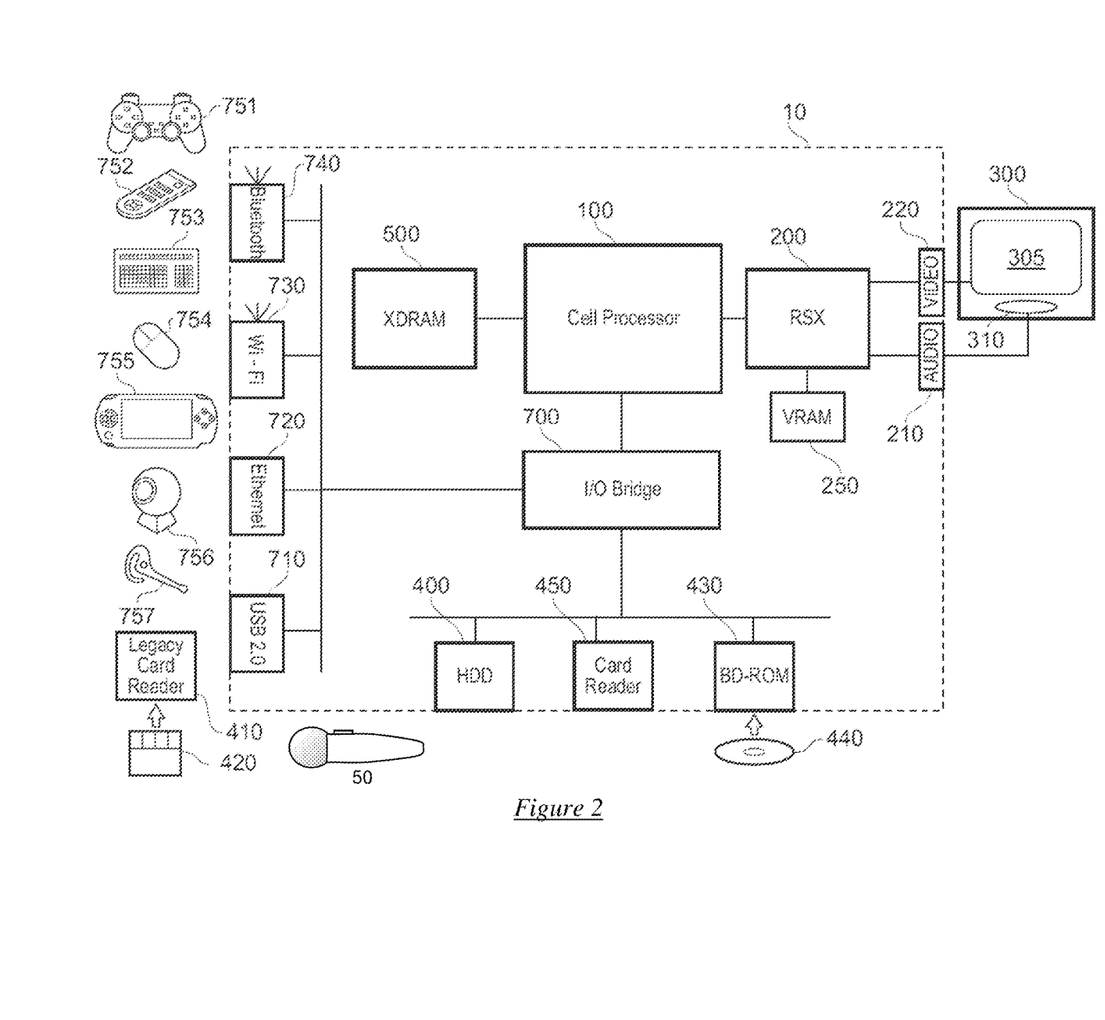
FIG. 2 is a schematic diagram of an entertainment system in accordance with an embodiment of the present invention.

Referring now also to FIG. 2, in an embodiment of the present invention the entertainment device is a Sony Playstation 3 (PS3®). FIG. 2 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device or a Playstation Vita®; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 50 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the PlayStation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Dance Transcription

Referring again to FIG. 1, in an embodiment of the present invention, the PS3 (or an equivalent development model of such a console) is placed in a performance recording mode. Whilst in this mode, the dancer 40 performs a reference performance of a dance whilst holding the or each Move controller.

The PS3 receives captured video from the EyeToy, and telemetry from the or each Move controller, for example via a Bluetooth® connection. Move controllers comprise a glowing ball, and when more than one such controller is used in conjunction with the same PS3, they can glow in respective colours to aid differentiation.

Consequently the video can be readily analysed by the Cell processor to identify high luminance pixels of approximately the expected colour of the or each Move controller, and hence identify a per-frame sequence of positions for the or each controller during the dance. These positions may then be described relative either to a preceding position or to a start position and recorded to a memory (for example the HDD).

Alternatively or in addition, some or all of the telemetry from the or each Move controller can be similarly recorded. This telemetry typically comprises outputs from one or more accelerometers (for example on X, Y and Z axes) and/or one or more gyroscopes (rotationally aligned with the X, Y and Z axes to give roll, pitch and yaw), thus forming up to a six-axis description of the motion of the Move controller. The telemetry may be transmitted as positional data, velocity data or acceleration data, or a mix of two or more of these.

Similarly the telemetry may be recorded as one or more of positional data, velocity data or acceleration data by the PS3, converting the data as necessary. Again, this telemetry data is typically recorded relative to a respective preceding value, or a respective start value, but may be recorded as absolute values.

In this way, data corresponding to the reference dance—as it will be danced whilst holding the or each Move controller—is automatically transcribed as a sequence of position, velocity, and/or acceleration data.

Error Tolerance

Such an accurate representation of a dance cannot be realistically expected to be matched perfectly by a subsequent player of the game who is trying to mimic the reference dance. Indeed, typically the competitive element of such a game is based upon the assumption that different players will only approximate the performance to a greater or lesser extent and hence receive different scores.

However, it is important in such a game that the player feels they receive a fair score, and within or between dances there will be moves that are inherently easier or more difficult to perform. Hence the present inventors have appreciated that it is important for a fair score, as perceived by a player, to have a variable tolerance to error that is responsive to such qualities of the dance.

To achieve this automatically, in an embodiment of the present invention the automatic transcription of the reference performance is accompanied by a scoring system implemented for example by the Cell processor that is arranged to take account of the apparent difficulty of the dance. It will be appreciated that a slow, expansive dance move will be easier for a player to replicate than a fast, complex move. Consequently, the scoring system generates a variable error tolerance so that more error with respect to the reference dance move is permitted for a difficult dance move than for an easy dance move. The generated error tolerance values are then recorded along with the transcribed reference dance.

To do this, the scoring system varies the error tolerance value responsive to a property of the transcribed data of the reference dance.

In an embodiment of the present invention, the property is the rate of change of acceleration (also known as 'jerk') derivable from the transcribed data at successive selected points during a performance. Hence during a dance, where a dance move is slow and expansive, the jerk will be very low, and so the error tolerance will be low (for example, near a predetermined minimum value). Later in the same dance, a rapid sequence of dance moves will result in rapid directional changes and hence higher jerk values, and so the error tolerance will be higher.

In a non-limiting example of its use, the jerk is calculated as the first derivative of acceleration values in the transcribed performance, and is then normalised with respect to a default value. In one embodiment, if the normalised value less than 1 (i.e. the jerk is less than the default value) then the error tolerance may be set to a 'low' state, whilst if the ratio is greater than 1 (i.e. the jerk is more than a default value), the error tolerance is set to a 'high' state. Alternatively, the ratio value itself may act as a weighting or scalar value, so that when the jerk is high, the error tolerance value is high and consequently it sets a high error threshold, or reduces penalty scores by a high amount, and so-on. The default jerk value may be determined empirically, and/or may be modified by a difficulty and/or age setting in the game. Similar approaches may be based upon acceleration or velocity properties.

In a refinement of this embodiment, the property is the ratio of jerk over velocity, which serves to emphasise whether a dance move is particularly sudden within the context of the dance.

In a similar manner, alternatively or in addition to jerk, the error tolerance may be made responsive to acceleration, velocity, or position, or a weighted combination two or more of these properties, or a ratio of two of these properties, for example.

It will be appreciated that the error tolerance may be linearly or non-linearly responsive to the selected property, and/or may be subject to an upper or lower cap. The or each cap may in turn vary according to a difficulty and/or age setting of the game.

The error tolerance can influence the game score in a number of ways. As will be described later herein, the transcribed reference dance and the transcribed player's dance are compared at selected points and the error between these is used to determine a score. In an embodiment of the present invention, the score awarded to the player is a perfect score minus a factor responsive to their error, and this factor can be also made responsive to the corresponding error tolerance value for the selected point.

Thus for example for a given error in performance, if the error tolerance value is low (indicating low tolerance), then the subtracted penalty for the error will be high, and conversely if the error tolerance value is high (indicating high tolerance), then the subtracted penalty for the error will be low.

Alternatively the error tolerance may be used to drive a variable threshold used to categorise between a successful move and a failed move, or simply an offset value for a subtracted penalty. A combination of these uses of the error tolerance can be chosen to vary the game play.

Hence more generally the error tolerance may be treated as a weighting, a scalar, an offset, or a threshold (depending on use) that is responsive to a property of the transcribed reference dance, as described above.

It will also be appreciated that the error tolerance may relate to all channels of the available reference dance data as transcribed (for example based on video capture of the Move controller and all six axes of telemetry) or may relate to only a subset of these channels. Hence for example the rotational telemetry from the Move controller may not be used, as the orientation of the controller in a player's hand may not be important to the performance of dances.

Conversely different channels of motion data may be subject to different levels of error tolerance (e.g. by use of different default values or weightings for different ratios, so weighting each motion data channel); hence for example in this case rotational telemetry may be scored but may have a much larger associated tolerance to player errors by use of a suitable ratio or normalisation factor. Similarly for different channels the error tolerance may be responsive to different parameters; for example, for the video input the error tolerance may be responsive to velocity, whilst for the X, Y and Z telemetry from the PS Move it may be responsive to jerk, as described above.

It will also be appreciated that different channels may be used for different dance tracks; a game designer may look at a reference performance and decide which channels of data are likely to be important in replicating the dance. Alternatively or in addition, the number of channels made subject to scoring and the level of tolerance may be made a function of an in-game difficulty and/or age setting.

The errors themselves may be expressed in relative or absolute terms. Thus for example if a player's Move controller is within 5 inches of a target pose at a give time, this may fall within a threshold driven by the error tolerance. Alternatively, if at a particular time the player's Move controller is within 5% of a target position relative to the start position, then this may fall within the a corresponding threshold. The determination of the errors is described later herein.

Finally, the error tolerance values generated over the course of the transcribed reference dance can optionally be used to gauge or rank the overall difficulty of the dance itself with respect to other, different dances. This may make it easier to select a series of dances that represent a consistent increase in difficulty over the course of a game campaign.

Key-Point Selection

It will be appreciated that if marks were given for comparisons between the reference and player dances at every frame of the dance, at a rate of typically 30 to 60 frames per second, then scores from slow but easy dance moves could outweigh short but difficult dance moves in a final tally of scores. Hence it is preferable to only assess (or at least retain or accumulate) scores at particular times or points during the dance.

In an embodiment of the present invention, in a first instance the player's performance is scored periodically, to ensure that there is a cumulative score over the course of the dance. The periodicity may be at the game designer's discretion, and may as non-limiting examples be every second, or for every beat of the music accompanying the dance, or for every $N^{th}$ beat, where N may be 2, 4, 8 etc, or at the start of each bar, and so on. In this sense the key-points are responsive to a time property of the transcribed data.

Alternatively or in addition, scoring key-points may be automatically selected based upon the transcribed data. Hence in an embodiment of the present invention, a scoring key-point may be added when one or more of the following events takes place within the transcribed data:
  i. One or more of positional, velocity, acceleration, and/or jerk values change over time by more than a predetermined absolute or relative threshold amount;
  ii. velocity in at least one of the X, Y or Z directions (or a resultant vector of velocity from these velocity components) changes sign, indicative of a reversal of direction and hence a significant point in a dance move; and
  iii. acceleration in at least one of the X, Y or Z directions (or a resultant vector of acceleration from these acceleration components) changes sign, indicative of initiating a dance move, by either speeding up or slowing down.

In this way, significant moments within the transcribed performance can be automatically detected, and at these moments the player's performance can be compared with that of the transcribed reference dance, and scored appropriately using the error tolerance described previously.

Where both periodic and event-driven selections are used, optionally hysteresis may be employed so that where there is a high density of events of an order of frequency similar to the periodic frequency, then the periodic keypoint selection is suspended in preference for the event-driven keypoint selection.

Scoring

As noted above, the player's performance may be evaluated at times calculated from an analysis of the reference performance. Thus as a non-limiting example, in an embodiment of the present invention a key-point is selected when a sum over time of the absolute values of the velocity (as measured on the X, Y and Z axes by the Move controller) in the transcribed data of the reference dance exceeds a threshold amount; in other words, when a threshold amount of movement has accumulated during the dance.

Subsequently, the player's corresponding performance is also transcribed as velocity data, and is evaluated at the key-point during play of the game.

In one embodiment of the present invention, the velocity data for the respective period of time for each of the reference dance and the player's dance are compared directly, for example to generate a sum-squared-error value of the differences between the two. This error value represents the deviation of the player's performance from the shape of the reference performance during the period between key-points. It will be appreciated that one of the data sets may first be re-scaled to best match the other, to account for different sizes of player, or different distances from the EyeToy, for example. Hence in this way the shape of the dance, in terms of changes in velocity, is compared in a scale-invariant fashion.

In another embodiment of the present invention, the velocity data for the respective period of time for each of the reference dance and the player's dance are each summed, to generate a vector representing the respective total change in velocity over the course of the period of time. These vectors may then be compared, for example using a dot product, to generate an error value. This error value represents the overall difference in motion between the reference performance and the player's performance during the period between key-points.

In either case, the generated error value may then be used to determine or modify a score for that key-point, in a manner similar to that described previously.

It will be appreciated that, like the error tolerance value described previously, the error value described above may be chosen to be responsive to one or more of position, velocity, acceleration and jerk, based upon one or more of the transcribed data channels.

Hence in another example, key-points are selected in response to points of inflexion (sign change) in the acceleration data of the X, Y and/or Z axes of the Move controller, and the error is simply the absolute acceleration value of the X, Y and/or Z axes of the player's Move controller at the key-point (since in principle at such key-points there should be no acceleration).

In another example, the key-points are selected in response to a threshold jerk level, and the error value is based upon a combination of the jerk level at the key-point and the number of input frames between the key-point and the local maximum level of jerk within the player's performance (hence indicative of the player's effort and timing).

Other bases for error values will be apparent to the skilled person.

The above arrangement of automatic dance transcription, error tolerance, and key-point selection provide a more cost effective and rapid solution to preparing reference dance tracks for a dancing videogame. The subsequent error evaluation and scoring of the player's performance at these key-points makes the game responsive to the salient aspects of the performance whilst also limiting the computational overhead of the game.

Moreover, because the process relies only on the same type of input data as that used by the eventual players of the game, this means it is also possible to incorporate within the game itself the feature of recording a reference dance performance by a player, for a friend to then mimic. Similarly, such player-generated performances could be uploaded to a server accessible by other players of the game, so that user-generated challenges are made available to the wider gaming community. In this case, the overall error tolerance values for such a performance could be used to automatically classify the difficulty of the uploaded dance.

Various modifications to the above system may be considered, as follows.

In an embodiment of the present invention, alternatively or in addition to the error tolerance being responsive to a parameter of one transcribed performance (such as rate of change of acceleration for one or more data channels), optionally the original dancer may replicate the dance one or more further times, and the variance of these transcribed reference performances may then be calculated. Hence in this case this variance is the property that the error tolerance is proportional to.

The variability of the reference dancer's performance will be indicative of the difficulty in reproducing the original dance by players of the game. The error tolerance value may then be made responsive to this variability either alone or in conjunction with other parameters as described previously.

In an embodiment of the present invention, the player's performance is captured only by a video camera (optionally a stereoscopic video camera, or a camera with a separate distance-measuring capability). The player's performance may then first be parameterised using a simple skeletal modelling technique, and the position, velocity and/or acceleration of one or more limbs or other points on the skeletal model can be transcribed to generate either reference dance data or player input data similar to that described previously, and usable in a similar manner. Where the camera is a monoscopic camera, the positional data may be limited to an X-Y plane, whereas when the camera is stereoscopic or augmented by a distance measurement system, the positional data may also comprise positions in the Z-direction.

Hence in a summary embodiment of the present invention, an entertainment system such as the PS3 10, comprises at least one input (710, 730, 740) operable to receive data representative of a reference dance performance (for example a video input, Bluetooth® receiver or other control input), a dance analyser (for example the Cell processor 100 under software instruction) operable to generate from analysis of the received data reference motion data descriptive of an aspect of the reference dance (for example movement of one or more elements of the dancer's body, or movement from one or more controllers), a key-point selector (for example the Cell processor under software instruction) operable to select a plurality of key-points in the reference dance, responsive to a property of the reference motion data, and an error tolerance calculator (again for example the Cell processor under software instruction) operable to generate error tolerance values at the plurality of key-points in the dance for use in scoring subsequent performances of the dance, the error tolerance values also being responsive to a (possibly different) property of the reference motion data.

In one instance of the summary embodiment, an input (e.g. a Bluetooth® receiver 740) is operable to receive telemetry from one or more game controllers (e.g. Move controllers 50) in communication with the entertainment system. In this case, the reference motion data comprises motion data generated by the dance analyser from the telemetry received from the or each game controller as described previously, whilst the or each game controller was held by the dancer during the reference performance of the dance.

Alternatively or in addition, an input (e.g. a video input, such as a USB input 710 that can be coupled to an EyeToy 756) is operable to receive captured video images comprising the reference dance performance. In this case the reference motion data comprises motion data generated by the dance analyser from analysis of the captured video images.

It will be appreciated therefore that the reference motion data can comprise multiple data channels, each providing a separate representation of an aspect of the same reference performance, as described previously.

The error tolerance values can be responsive to one or more properties from a list consisting of position, velocity, acceleration and jerk, either separately or in one or more combinations. For example, the error tolerance values can be responsive to the property of the ratio of jerk over velocity.

Other properties may be generated based upon multiple reference performances of the same dance, and then stored with the reference performance chosen for use in subsequent comparisons with player performances. Hence in an instance of this summary embodiment the dance analyser is operable to generate motion data for one or more captured repetitions of the reference dance, and a property of the reference motion data at a predetermined point is the variance of the motion data.

As noted above, the reference motion data may have a plurality of data channels. Hence the reference motion data can be treated has comprising a plurality of sets of motion data (one set being one channel). Hence in an instance of this summary embodiment, the error tolerance calculator is operable to generate an error tolerance value in response to only a subset of the motion data sets. Similarly, the error tolerance calculator can be made operable to generate an error tolerance value in response to a plurality of differently weighted motion data sets. Hence for example the generated error tolerance value may no depend upon the gyroscopic inputs at all, whilst the motion data from analysis of the captured video have a lower weighting than the motion data from the Move accelerometer telemetry.

As noted above, in an instance of this summary embodiment the entertainment system comprises a key-point selector operable to select points in the reference dance for subsequent comparison with a later performance of the dance by a dance-game player, responsive to a property of the reference motion data. The key points are generally selected based upon some change in the or each property of the reference motion data that is chosen. For example, the keypoint operator can select points in the reference dance responsive one or more of the following listed events; a periodic event, a sum magnitude of displacement over time exceeding a predetermined threshold, a sum magnitude of velocity over time exceeding a predetermined threshold, a velocity value changing sign, and an acceleration value changing sign.

In an instance of this summary embodiment, the entertainment system comprises a scoring system (for example the Cell processor under software instruction) operable to estimate an error value based upon a comparison of the reference motion data and player motion data generated responsive to a player's attempt to perform the reference dance. In this case, the scoring system can be made operable to rescale one of the reference motion data and player motion data to substantially match the scale of the other of the reference motion data and player motion data prior to comparison. This compensates for different size player, and different player positions with respect to the EyeToy.

The scoring system is then operable to calculate a score responsive to the estimated error value and responsive to the generated error tolerance value. Hence the penalties incurred for errors in the players performance are modified by the error tolerance values generated in response to the reference performance, making the game appear more fair to the players.

The entertainment system is likely to take one of two forms. When authoring the game, the entertainment system is likely to be a development platform, which operates in a similar manner to the home-user console but which has additional features to aid development. When playing the game, the entertainment system is likely to be the home-user console. The home-user console will then be operable to load a dance game implementing some or all of the above techniques, and hence the game will comprise reference motion data for at least one pre-recorded reference dance. However in addition, as noted above, the home-user console can also generate reference motion data for at least one additional reference dance performed by a player of a dance game, so that they can create dance challenges for their friends, and/or contribute dance challenges to a wider on-line audience.

Figure 3:
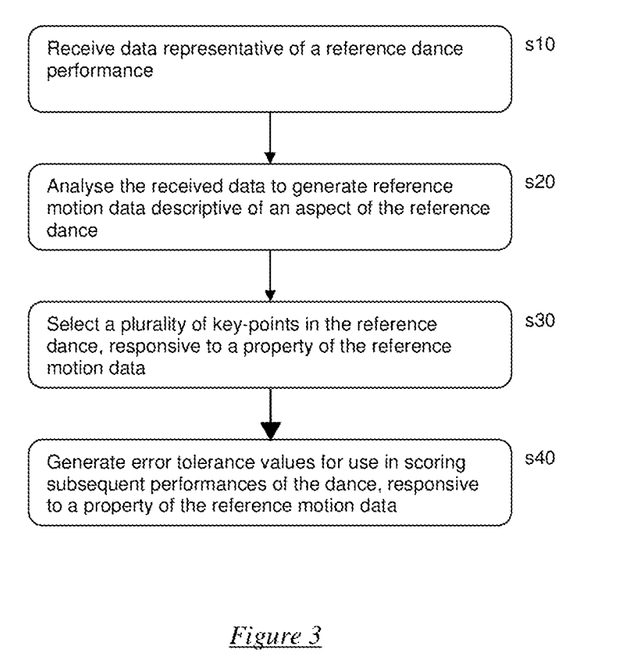
FIG. 3 is a flow diagram of a method of motion scoring in accordance with an embodiment of the present invention.

Referring now to FIG. 3, a method of motion scoring comprises:

in a first step s10, receiving data representative of a reference dance performance;

in a second step s20, analysing the received data to generate reference motion data descriptive of an aspect of the reference dance;

in a third step s30, selecting a key-point in the reference dance, responsive to a property of the reference motion data and in a fourth step s40, generating error tolerance values at the plurality of key-points in the dance for use in scoring subsequent performances of the dance, the error tolerance values being responsive to a property of the reference motion data.

It will be apparent to a person skilled in the art that variations in the above method corresponding to operation of the various embodiments of the apparatus as described and claimed herein are considered within the scope of the present invention, including but not limited to:

when the data representative of a reference dance performance comprises telemetry from one or more game controllers in communication with an entertainment system and held by a dancer during the reference performance of the dance, the step of analysing the received data comprises analysing some or all of the telemetry to generate reference motion data descriptive of an aspect of the reference dance;

when the data representative of a reference dance performance comprises captured video images comprising the reference dance performance, the step of analysing the received data comprises analysing the video images to generate reference motion data descriptive of an aspect of the reference dance;

the analysis can be based on some or all of the sets of data in the reference motion data, and these can be weighted to a greater or lesser extent;

a step of estimating an error value based upon a comparison of the reference motion data and player motion data generated responsive to a player's attempt to perform the reference dance, optionally rescaling data for one of the performances to compare like with like; and a step of generating a score for the player's dance move at the keypoint, responsive to the error value and modified by the error tolerance value.

Finally, it will be appreciated that the methods disclosed herein may be carried out on conventional hardware suitably adapted as applicable by software instruction or by the inclusion or substitution of dedicated hardware. Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media that may be considered to be non-transitory machine readable signal bearing media tangibly encoded with a program, or similarly may be realised in hardware as an ASIC (application specific integrated circuit) or an FPGA (field programmable gate array) or other configurable circuit suitable to use in adapting the conventional equivalent device. Alternatively the program may be transmitted via data signals on a network such as an Ethernet, a wireless network, the Internet, or any combination of these of other networks.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. An entertainment system, comprising:

at least one input operable to receive data representative of a reference dance performance of a dance during a performance recording mode, the performance recording mode occurring while a dancer performs the dance; and one or more processors operatively coupled to the at least one input, the one or more processors implementing:

a dance analyser operable to generate, from analysis of the received data, reference motion data descriptive of an aspect of the reference dance performance;

a key-point selector operable to select a plurality of event-driven key-points in the reference dance performance, the selection of the plurality of event-driven key points being responsive to a property of the reference motion data, the property of the reference motion data being one or more of a positional, velocity, acceleration or jerk value change over time by more than a selected threshold amount;

an error tolerance calculator operable to generate error tolerance values at the plurality of selected event-driven key-points in the reference dance performance for use in scoring one or more subsequent dance performances, the error tolerance values being linearly or nonlinearly responsive to the property of the reference motion data for each selected event-driven key-point, and the error tolerance values being stored for use in the scoring of the one or more subsequent dance performances;

wherein the one or more processors are configured to:

compare the stored error tolerance values against motion data of the one or more subsequent dance performances to determine a degree of error for each of the subsequent dance performances, the motion data of the one or more subsequent dance performances being of a same type as the received data representative of the reference dance performance; and when the determined degree of error for a given one of the subsequent dance performances exceeds an error tolerance threshold, generate a score indicative of the determined degree of error.

2. The entertainment system according to claim 1, in which:
one of the at least one inputs is operable to receive telemetry from one or more game controllers in communication with the entertainment system; and in which
the reference motion data comprises motion data generated by the dance analyser from the telemetry received from the or each game controller whilst the or each game controller was held during the reference dance performance.

3. The entertainment system according to claim 1, in which:
the at least one input is operable to receive captured video images comprising the reference dance performance; and in which
the reference motion data comprises motion data generated by the dance analyser from analysis of the captured video images.

4. The entertainment system according to claim 1, in which the property of the reference motion data is a ratio of jerk over velocity.

5. The entertainment system according to claim 1, in which the dance analyser is operable to generate motion data for one or more captured repetitions of the reference dance performance, and a property of the reference motion data at a predetermined point is the variance of the motion data.

6. The entertainment system according to claim 1, in which the reference motion data comprises a plurality of sets of motion data, and the error tolerance calculator is operable to generate an error tolerance value in response to only a subset of the motion data sets.

7. The entertainment system according to claim 1, in which the reference motion data comprises a plurality of sets of motion data, and the error tolerance calculator is operable to generate an error tolerance value in response to a plurality of differently weighted motion data sets.

8. The entertainment system according to claim 1, wherein the one or more processors are further configured to implement:
a scoring system operable to estimate an error value based upon a comparison of the reference motion data and player motion data generated responsive to a player's attempt to perform the dance; and in which
the scoring system is operable to rescale one of the reference motion data and player motion data to match the scale of the other of the reference motion data and player motion data prior to comparison.

9. The entertainment system according to claim 8, in which the scoring system is operable to calculate a score responsive to the estimated error value and responsive to the generated error tolerance value.

10. The entertainment system according to claim 1, comprising reference motion data for at least one pre-recorded reference dance, and operable to generate reference motion data for at least one additional reference dance performed by a player of a dance game.

11. The entertainment system according to claim 1, in which the error tolerance calculator is operable to generate the error tolerance values for one or more channels of the reference motion data, each channel corresponding to a given one of the at least one input.

12. The entertainment system according to claim 11, in which the error tolerance calculator is further operable to generate the error tolerance values having different levels of error tolerance for different ones of the one or more channels.

13. The entertainment system according to claim 1, in which the one or more processors are configured to determine an overall difficulty of the reference dance performance according to the error tolerance values.

14. The entertainment system according to claim 1, wherein the error tolerance calculator is operable to generate the error tolerance values responsive to the particular property of the reference motion data by generating a variable error tolerance responsive to one or more qualities of the dance.

15. The entertainment system according to claim 14, wherein the variable error tolerance is subject to at least one of an upper cap and a lower cap.

16. The entertainment system according to claim 1, wherein the key-point selector is further operable to select additional key-points points in the reference dance performance responsive to a time property of the reference dance performance.

17. A method of motion scoring by an entertainment device, comprising the steps of:
receiving data representative of a reference dance performance of a dance from at least one input during a performance recording mode, the performance recording mode occurring while a dancer performs the dance;
analysing, by one or more processors, the received data to generate reference motion data descriptive of an aspect of the reference dance performance;
selecting, by the one or more processors, a plurality of event-driven key-points in the reference dance performance, the selection of the plurality of event-driven key points being responsive to a property of the reference motion data, the property of the reference motion data being one or more of a positional, velocity, acceleration or jerk value change over time by more than a selected threshold amount;
generating, by the one or more processors, error tolerance values at the plurality of event-driven key-points in the reference dance performance for use in scoring one or more subsequent dance performances, the error tolerance values being linearly or nonlinearly responsive to the property of the reference motion data for each selected event-driven key-point;
comparing the stored error tolerance values against motion data of the one or more subsequent dance performances to determine a degree of error for each of the subsequent dance performances, the motion data of the one or more subsequent dance performances being of a same type as the received data representative of the reference dance performance; and
when the determined degree of error for a given one of the subsequent dance performances exceeds an error tolerance threshold, generating a score indicative of the determined degree of error.

18. The method of motion scoring according to claim 17, in which the data representative of the reference dance performance comprises telemetry from one or more game controllers in communication with an entertainment system and held by a user during the reference dance performance; and the step of analysing the received data comprises:
analysing some or all of the telemetry to generate reference motion data descriptive of an aspect of the reference dance.

19. A non-transitory computer program product storing computer instructions thereon, the instructions, when executed by one or more processors, perform a method of motion scoring, the method comprising:

receiving data representative of a reference dance performance of a dance from at least one input during a performance recording mode, the performance recording mode occurring while a dancer performs the dance;

analysing the received data to generate reference motion data descriptive of an aspect of the reference dance performance;

selecting a plurality of event-driven key-points in the reference dance performance, the selection of the plurality of event-driven key points being responsive to a property of the reference motion data, the property of the reference motion data being one or more of a positional, velocity, acceleration or jerk value change over time by more than a selected threshold amount;

generating error tolerance values at the plurality of event-driven key-points in the reference dance performance for use in scoring one or more subsequent dance performances, the error tolerance values being linearly or nonlinearly responsive to the property of the reference motion data for each selected event-driven key-point;

comparing the stored error tolerance values against motion data of the one or more subsequent dance performances to determine a degree of error for each of the subsequent dance performances, the motion data of the one or more subsequent dance performances being of a same type as the received data representative of the reference dance performance; and when the determined degree of error for a given one of the subsequent dance performances exceeds an error tolerance threshold, generating a score indicative of the determined degree of error.

* * * * *